United States Patent [19]

Lange

[11] 3,758,028
[45] Sept. 11, 1973

[54] MIXING VALVE AND THERMOSTAT FOR USE WITH SAME

[76] Inventor: Hermann Paul Lange, Singlistrasse 15, Zurich, Switzerland

[22] Filed: Nov. 29, 1971

[21] Appl. No.: 202,874

[30] Foreign Application Priority Data
Dec. 2, 1970  Austria............................ 4A 10848

[52] U.S. Cl............. 236/12 R, 137/607, 137/636.4
[51] Int. Cl........................................... F16k 19/00
[58] Field of Search...................... 236/12 R, 12 A; 137/607, 636.1, 636.4

[56] References Cited
UNITED STATES PATENTS

| | | | |
|---|---|---|---|
| 2,585,726 | 2/1952 | Barker | 236/12 |
| 2,898,938 | 8/1959 | Dombre | 137/607 X |
| 3,002,531 | 10/1961 | Katua | 137/607 X |
| 3,364,566 | 2/1968 | Schmitt et al. | 137/607 X |

FOREIGN PATENTS OR APPLICATIONS

| | | | |
|---|---|---|---|
| 1,069,190 | 5/1967 | Great Britain | 236/12 |

*Primary Examiner*—William F. O'Dea
*Assistant Examiner*—Peter D. Ferguson
*Attorney*— Dean S. Edmonds, James W. Laist et al.

[57] ABSTRACT

A mixing valve for controlling both total volume of flow and relative volumes of flow through two inlet valves, such as hot and cold water valves, has the two valves bearing against a pressure plate which is tiltable on an axis offset with respect to the two valves. By increasing or decreasing the angle of tilt of the pressure plate, both valves are caused to open or close, increasing or decreasing the total volume of flow. By rotating the axis of tilt of the pressure plate relative to the valves, one valve or the other is caused to open or close more than the other, varying the relative volumes of flow through the two valves. Thermostat means may be provided to control rotation of the pressure plate to maintain a uniform temperature of the mixed outflow of the two valves.

26 Claims, 13 Drawing Figures

INVENTOR.
Hermann Paul Lange
BY Pennie, Edmonds,
Morton, Taylor & Adams
ATTORNEYS

MIXING VALVE AND THERMOSTAT FOR USE WITH SAME

The invention relates to a mixing valve for adjusting the mixture ratio of two fluids and the total flow by means of two inlet valves, having a temperature regulating part and a pressure plate acting on both valves and capable of being tilted on an axis by a flow control, and a thermostat to be used with said mixing valve.

There are known mixing valves that employ a pressure plate, sometimes called a swash plate. However, such valves suffer from an essential disadvantage.

Since a swash plate resting only on one edge or shoulder, not specially guided or seated, is used, it reacts to pressure surges in the circuit by flutter, noise and temperature changes. There is also a known mixing valve in which a hinge-like articulation is used as connection between the swash plate and the temperature adjusting part. As a result, when the temperature setting is turned while the valve is closed, there is severe wear on the valve stem, joint and packings.

Further, there are no known mixing valves of this type that provide a thermostatic control for the outlet flow of water.

There are of course known thermostats for use in mixing valves of other types, but most of them have inadequate response and suffer comparatively severe wear and/or maintenance trouble. Hence for example a shower bath requires frequent manual readjustment of temperature or flow during use. There is a great deal of maintenance work to be done as well. All such known mixing valves are of inadequate utility because of undue wear of parts and/or packings.

The object of the present invention is to provide a mixing valve and thermostat for use therewith having a heretofore unequaled service life of all parts and insensitive to improper manipulation, in particular to turning of the temperature control part when the flow control is closed. The mixing valve is to be likewise capable of embodiment as a thermostatic regulating valve or for exclusively manual setting of the outlet temperature. At the same time the thermostat is to keep the outlet temperature constant within fractions of a Celsius degree under all conditions, even, that is, with changing outlet flow or frequent pressure and temperature changes in the supply system. This problem is solved, according to the invention, in that the pressure plate is guided by two bearings connected with the temperature regulating part and determining the axis of tilt, the bearings being in the form of a slip coupling permitting axial rotation of the pressure plate relative to the temperature control part in any position of the flow control.

The advantage of this measure consists in that trouble in the pressure plate mechanism can no longer result from scaling or other fouling of the pressure plate bearings, since the plate, turning on the bearings in the manner of a slip coupling, provides a self-cleaning action of the bearings. This slip coupling is operative even if the flow control is completely closed. Hence the points of contact between the pressure plate and the valve members do not suffer any phenomena of wear. This lengthens the life of the valve very substantially. The spring-like construction of the slip coupling moreover is somewhat self adjusting, so that wear is imperceptible in practice at these points also.

An especially advantageous embodiment of the idea of the invention is characterized in that the pressure plate is tightly connected to an elastic corrugated tube attached to the valve housing with interposition of a gasket and exerting an axially directed spring action on the pressure plate, and in that the guide spring is arranged completely inside the chamber formed by the corrugated tube and pressure plate, entirely sealed off from the fluid. In this embodiment, the mechanical moving parts are hermetically sealed away from the liquid so that trouble due to dirt and scale is completely eliminated. The bearings can be permanently lubricated, so that with suitable choice of material there is practically no wear. Besides, in this case, any dynamic seals between the housing and the spindles can be dispensed with. This too results in a quite substantial lengthening of the life of the mixing valve.

The thermostat according to the invention, to be used in such a mixing valve, is characterized by a thermostatic element mounted on a guide between the temperature regulating part and the guide spring, which element, on the basis of the operation of regulating to the preset temperature, generates a rotation which the guide converts into a rotation of the guide spring relative to the temperature regulating part. In this way it is possible to build a standard mixing valve in which the mixture ratio can be manually varied in one model and manually present in another model, the preset temperature being regulated by the thermostat. Through extensive use of identical and matched parts, the one arrangement may even be replaced by the other in a valve already installed. This is done by mounting a different insert in the valve housing.

Other features and advantages of the invention will appear from the description and claims.

Some embodiments of the invention will now be explained in more detail with reference to the drawings by way of example. In the drawings, FIG. 1 shows a sectional view of a mixing valve with thermostat control;

Figure 1:
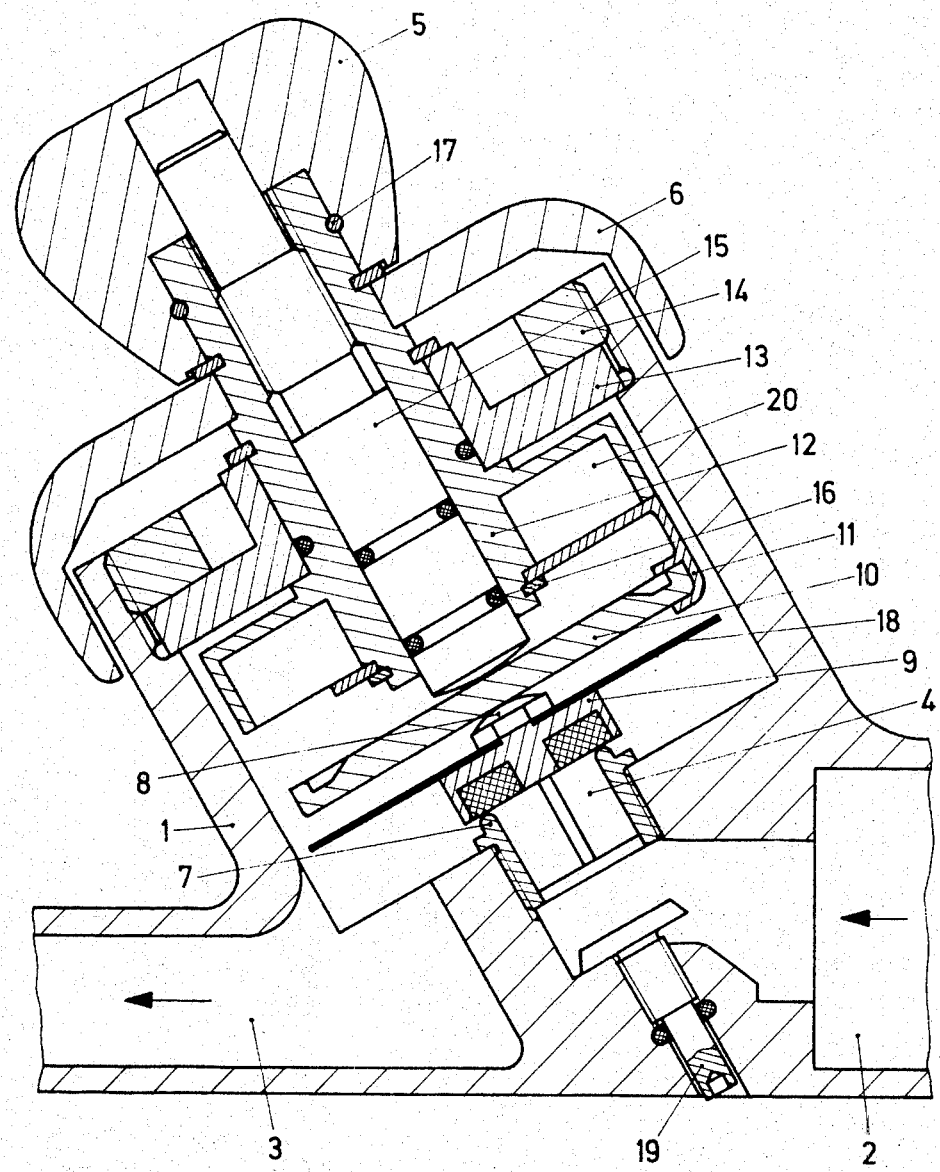

The mixing valve with thermostatic control as shown in FIG. 1 consists of a body 1 connected by way of inlets 2 to a hot and a cold water line and having an outlet 3. By way of one valve 4 each for hot and cold water, the flow is regulated with a handle 5 operated from the outside, and the relative apertures of the two valves 4 and hence the outlet temperature are regulated with a temperature ring 6.

The two valves 4, only one of which is seen in FIG. 1, the other being behind it in this view, each consist of a valve seat 7 and a valve member 9 mounted on a stem 8. The top of the stem 8, in the form of a feeler, is in contact with a pressure plate 10, guided, in a spring 11 to be described later. The guide spring 11 is fixed to a temperature regulating part 12 mounted and centrally guided in the body 1 by a cover 13. The cover 13 is secured in the housing by a screw lock 14. On the top of the temperature regulating part 12, protruding from the body 1, the temperature regulating ring 6 is fixed.

The temperature regulating part 12 is provided with a central bore and a thread in the upper part of the bore. In this bore is arranged a spindle 15 resting at the bottom against the pressure plate 10, sealed off from the temperature regulating part 12 gy packing rings 16, and engaging the thread of the temperature regulating part 12 at the top. The top of the spindle 15 is preferably provided with a square on which the flow control handle 5 is mounted. The latter is guided for example by means of an expansion ring 17 on the outer periphery of the temperature regulating part 12. By its axial travel, the spindle 15 controls the obliquity of the pressure plate 10 and hence the outlet flows of the valves 4.

Alternatively, of course, the pressure plate may be attached directly to the spindle 15, for example by means of a screw concentrically fastened to the spindle and holding the pressure plate through a central hole in the latter.

The two valve members 9 are attached to a common valve spring 18 which in this embodiment is a slitted disc centered in the body 1 with respect to the spindle 15. This spring serves primarily to guide the valve members and secondarily, in case of failure or high differential of water pressure in the cold or hot water line, to act as a back-up check, returning the valve members to the seats. The spring used is preferably bronze.

In the lower part of the body 1, a shut-off and adjusting screw 19 is arranged, guided in a thread cut in the body 1 and sealed off from the outside by a packing ring. The shut-off and adjusting screw serves to disconnect the inlet 2 from the mixing valve independently of the setting of the valve 4, so that the mixing valve can be assembled or serviced without need to shut off the supply lines separately.

In the embodiment described by way of example with reference to FIG. 1, the bottom of the temperature regulating part 12 is provided with a device consisting of radially arranged bimetal members 20, forming a thermostat control to be described later.

Figure 3:
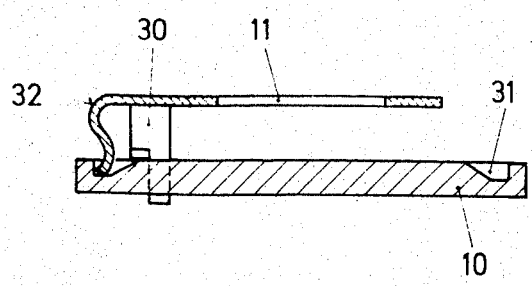
FIG. 3 shows a section at III—III in FIG. 2.
Figure 2:
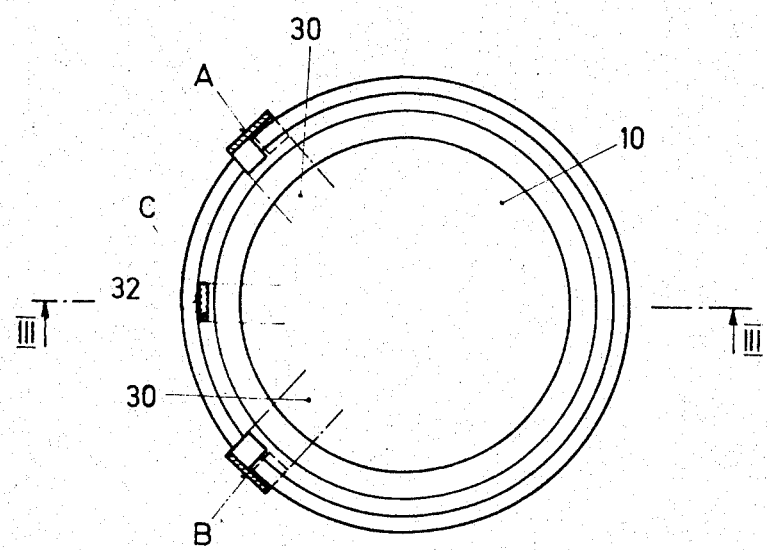
FIG. 2 shows a top view of the pressure plate, retained by a guide spring.
Figure 4:
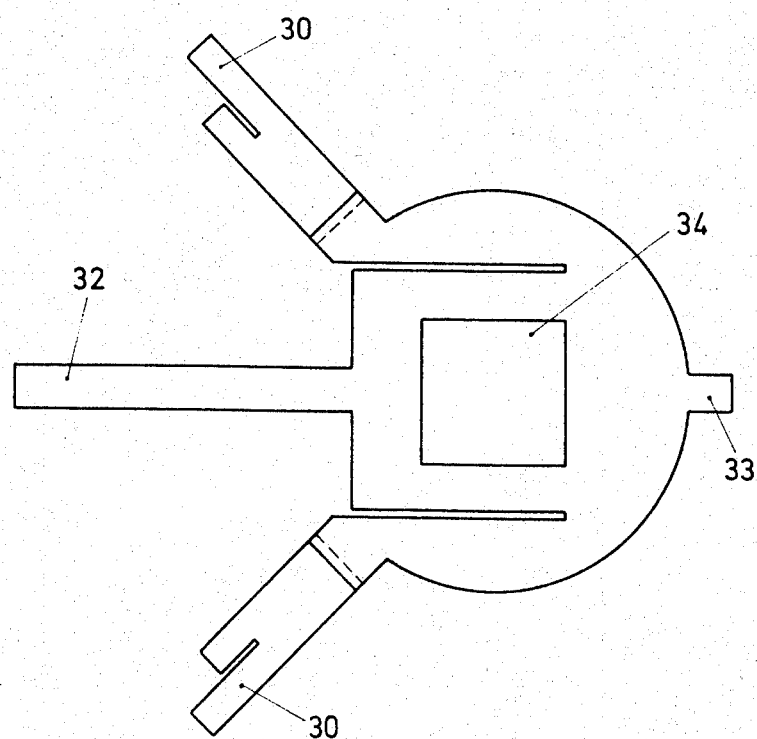
FIG. 4 shows a developed representation of the guide spring of FIGS. 2 and 3.

The guide spring 11 represented in FIGS. 2 to 4, made for example of spring bronze, consists of two arms 30 extending radially in relation to the pressure plate 10. The angle enclosed by these arms is less than 180°. It is preferably about 90°.

In the marginal zone of the pressure plate 10, the arms are bent off axially to the pressure plate, so that the rest of the guide spring is arranged parallel to the pressure plate at some distance from it. The lower portion of the bent part of the arms 30 is so shaped that the pressure plate 10 is guided axially in a fork, but is freely rotatable about its axis in the bearings A and B formed by these parts of the arms.

This fork-like guidance of the arms 30 is obtained by bending one portion of the outer part of such an arm over the pressure plate and another portion under it inward. For accurate guidance of the plate 10 in the bearings A and B, the plate 10 is provided firstly with a concentric annular groove, and secondly a part of the spring 11 in the region of the angle between the two arms 30 forms a tab 32. The tab engages the groove 31 in such a way that it provides the plate at a point of purchase C with a component of force directed radially outward and with an axial component, directed downward in FIG. 3. As shown in FIG. 4, the guide spring 11 has a stop 33 cooperating for example with the body 1 and limiting the angle of rotation for the guide spring. In addition, the guide spring has a central square opening 34 serving to secure the spring to the temperature regulator part 12. The part 12 is provided at the corresponding point with a matching square. The guide spring thus serves both as an articulation for the pressure plate 10, the axis of tilt of the plate being determined by the line AB in FIG. 2, and as a precision slip coupling in case of a rotation of the axis of tilt of the plate relative to the valve members 9 when the temperature is being set with the temperature regulating part. The pressure plate is held at its outer edge by the two arms 30 of the guide spring, while the tab 32 engages the annular groove and guides the plate precisely within the triangle of forces ABC, the point of application of the tab inside the groove determining the point of pressure C. At the same time, the force of the tab at point C holds the plate away from the valve members 9 and pressed towards the bottom end of the spindle 15. The entire arrangement is so contrived that the connecting line AB is tangent to that circle on the plate 10 which the stems 8 of the valve members 9 describe upon it when the plate is rotated.

When the valve is closed, that is, when the spindle 15 is screwed in, the spindle presses the plate 10 down on the stems 8 of the valve members, closing both valves. In this condition, the plane of the pressure plate is precisely perpendicular to the axes of the stems 8. Although in this position the pressure plate is locked by the pressure of the spindle and its contact with the stems 8, the temperature regulating ring 6, acting on the guide spring 11 by way of the temperature regulating part 12, can be turned at will, since the tab 32 is able to slide in the groove 31, and the two arms 30 along the edge, of the pressure plate. This sliding action at the same time renders the arrangement self cleaning, since dirt and deposits will be removed by the friction of the motion described. Any shrinkage of the packings of valve members 9 in the course of time will also be compensated by the action of the guide spring.

When the spindle 15 is screwed back, the pressure plate 10 will flop open towards the spindle by action of the spring tab 32. If the axis of tilt AB of the plate 10 is for example over the stem 8 of the hot water valve, then this flopping action can open only the other valve, the cold water valve in this example.

During the entire flopping action, the stem, following under water pressure, is in contact with the pressure plate. If the axis of tilt AB is over the other valve, the cold water valve, then similarly only the hot water valve will open. Between these extreme positions, about 180° apart in the example, the position of the axis of tilt AB can be adjusted at will with the temperature regulating ring 6 and part 12. Starting from one extreme position, as the axis of tilt AB is rotated, the open valve is continually being closed by the same amount by which the originally closed valve is being opened, the sum of the two amounts being constant. The result is a constant outlet flow and, through the variation of the mixture ratio, a changing temperature of the water flowing out of the outlet 3. The absolute outlet flow is determined by the obliquity of the plate only, that is, by the position of the spindle 15. The action of the line pressure holds the stems 8 of the valves pressed against the surface of the pressure plate, thus achieving a positive action of the control mechanism.

Figure 12:
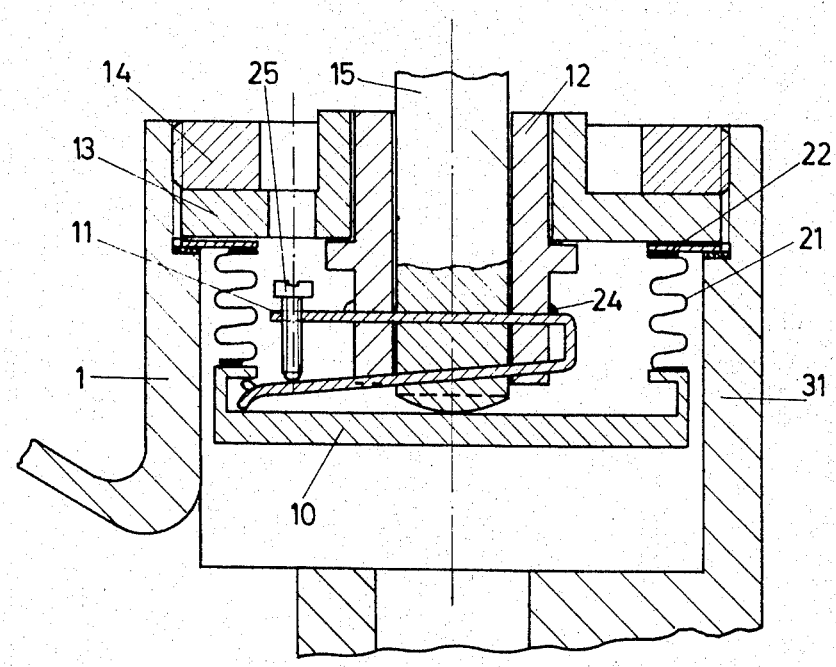
FIG. 12 shows a sectional view of another embodiment of a mixing valve.
Figure 13:
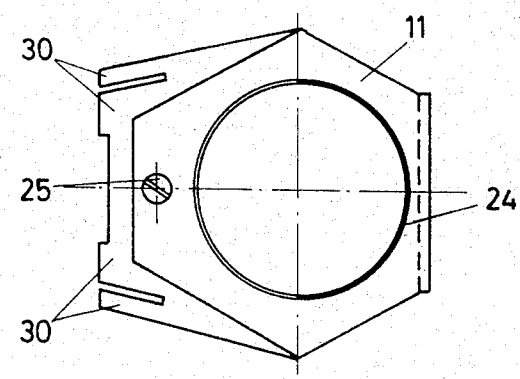
FIG. 13 shows the guide spring of FIG. 12 in top view.

According to another embodiment represented by way of example in FIGS. 12 and 13, the guidance of the pressure plate may be arranged ranged inside a chamber sealed off from the water by a corrugated tube, so that fouling of the regulating parts by scale deposits is completely excluded, and no spindle seals, or stuffing boxes, as in known mixing valves, are required. The arrangement shown in FIG. 12 corresponds in essentials to the embodiment shown in FIG. 1. The pressure plate 10, having an annular groove 31 flanged at the top, is fixed, for example soldered, to a corrugated spring tube 21. The top of the tube 21 is fixed, for example likewise soldered, to a flange 22, and sealed against the body 1 by a gasket 23. The flange 22 is pressed against the gasket 23 by the cover 13. The guide spring 11, which performs the same function as in the embodiment of FIG. 1, is shown in detail in FIG. 13. It has two spring arms 30 with tips spread away from each other. The spread tips clip into the annular groove and automatically equalize any abrasion. The spring tab 32 shown in FIG. 2 to 4 of the first embodiment is omitted, its function being assumed by the corrugated tube 21.

The guide spring 11, bent into a U shape, is attached by one leg to the temperature regulating part 12 by a soldered joint 24. The guide spring 11 can be spread from the other leg with a setscrew 25 held by a thread in the first leg. The setscrew is accessible through a hole 26 in the cover 13, so that the pressure action of the guide spring on the valve can be adjusted or readjusted.

The mechanism arranged inside the corrugated tube may be provided with permanent lubrication, practically excluding abrasion and other forms of wear. In this example also, the slip coupling between the pressure plate and the spring arms of the temperature regulating part can operate when the flow control is closed without any damage or additional wear hazard.

As already mentioned with reference to FIG. 1, the mixing valve may comprise a thermostatic control.

The thermostat part will now be described in more detail with reference to FIGS. 5 and 6. In this embodiment, according to FIG. 5, the guide spring 11 is not positively attached to the temperature regulating part 12, but is arranged freely rotatable on it. The square opening 34 shown in FIG. 4 is in this case replaced by a round opening. Immediately above the guide spring, the temperature regulating part 12 is provided with a cup 40 accommodating the thermostat elements, for example bimetal elements 20. This cup 40 may either be in one piece with the temperature regulating valve 12, machined for example out of the same stock, or it may be positively attached to it.

Figure 5:
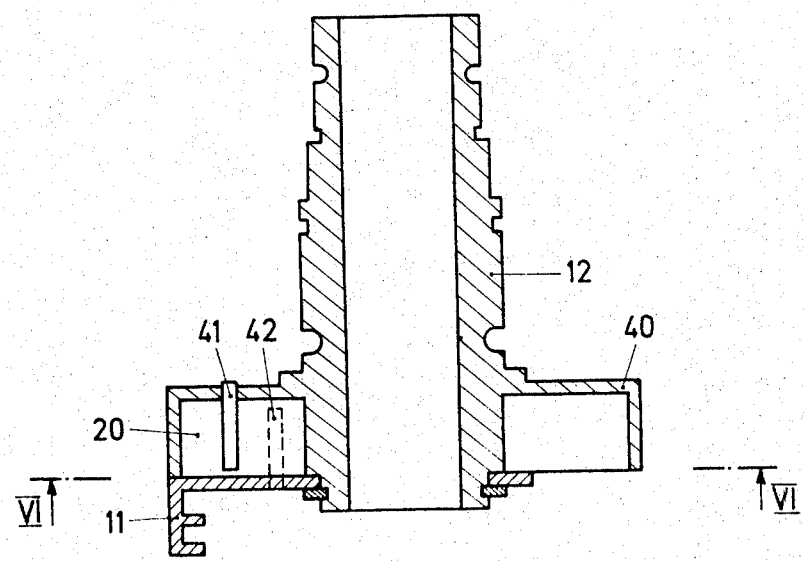
FIG. 5 shows a part of FIG. 1 with suspension for the bimetal springs.
Figure 6:
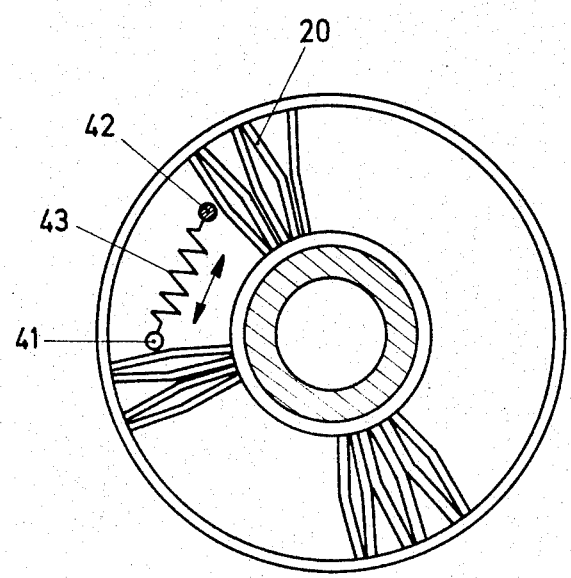
FIG. 6 shows a section at VI—VI in FIG. 5.

On the cup 40 is provided a projection 41 extending into it, which may be in the form of a pin as in FIG. 5. Another projection 42 is fixed to the guide spring 11 so as to extend into the cup 40 likewise. As shown in FIG. 6, the two projections 41 and 42 are arranged at an angle from each other. The obtuse angle between the two projections is filled up with bimetal elements in substantially radial arrangement, bimetal sheet strips in the example.

The guide spring 11 in this embodiment is fashioned so that it secures the bimetal elements 20 against dropping out of the cup 40. The length of the bimetal elements 20 is so chosen that they are in sliding contact with the walls of the cup 40. The acute angle between the projections 41 and 42 contains a restoring spring 43 exerting a force on the two projections 41 and 42.

Under the influence of temperature, the bimetal elements 20 in their star-shaped arrangement in the cup 40 will undergo more or less deflection. Since the bimetal elements are in contact with the walls of the cup 40, their deformation will have the effect of a pressure exerted along a circle inside the cup against the spring action of the restoring spring 43. This brings about a rotation of the guide spring 11 relative to the preset position of the temperature regulating part 12 and hence a rotation of the axis of tilt AB of the pressure plate 10.

After manual preselection of a certain temperature with the temperature regulating ring 6, for example a temperature that would call for a cold and hot water mixture ratio of 1:1, the bimetal springs will expand by an amount just corresponding to that temperature against the force of the restoring spring 43. This normal expansion, however, is allowed for in the indication of the setting temperature on the temperature regulating ring 6. But if the outlet temperature rises, for example because of temperature and/or pressure fluctuations in the supply system, the bimetal elements 20 will expand by an additional amount, exerting an increased pressure on the second projection 42 fastened to the guide spring 11, against the action of spring 43, and bringing about a further rotation of the guide spring and hence of the axis of tilt AB. The direction of rotation of the guide spring 11 and the arrangement of the cold and hot water valves is such that rising temperature causes closing operation of the hot water valve and a corresponding opening of the cold water valve. In that case, then, when the temperature rises the hot water valve will be closed by a certain amount, while the cold water valve is open by a corresponding amount. This restores the temperature set on the temperature regulating ring 6, while the outlet flow remains constant. Through this controlled operation, when the fitting is opened any cooled water that may be present in the hot water line will be preferentially drained off, whereafter, when hotter water appears, the thermostat will automatically bring the outlet temperature to the preset value.

It is obvious that instead of the bimetal elements 20 described, a spirally wound bimetal spring might be used, or any other temperature-sensitive element, such as for example a gas-filled spring bellows (corrugated tube) or a Bourdon spring.

Figure 8:
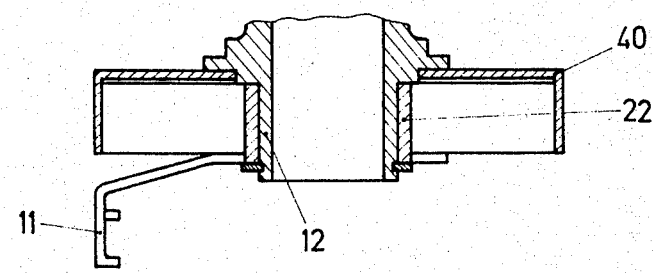
FIG. 8 shows a section at VIII—VIII in FIG. 7.
Figure 7:
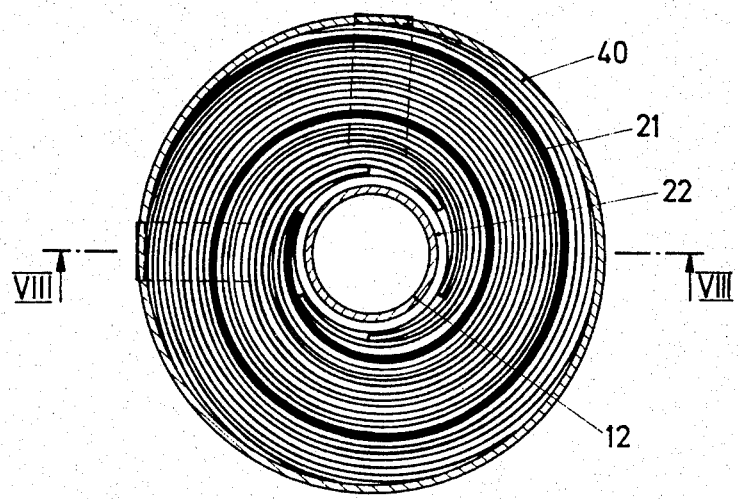
FIG. 7 shows the suspension with spiral bimetal springs.

An arrangement with spiral bimetal springs 21 is shown in FIG. 7. The outer ends of the spiral springs are fixed to the rim of the cup 40, while the inner ends are attached to a cylindrical prolongation 22 of the guide spring 11. As shown in FIG. 8, the cylindrical prolongation 22 is mounted on the temperature regulating part 12 freely rotatable together with the guide spring 11.

Figure 9:
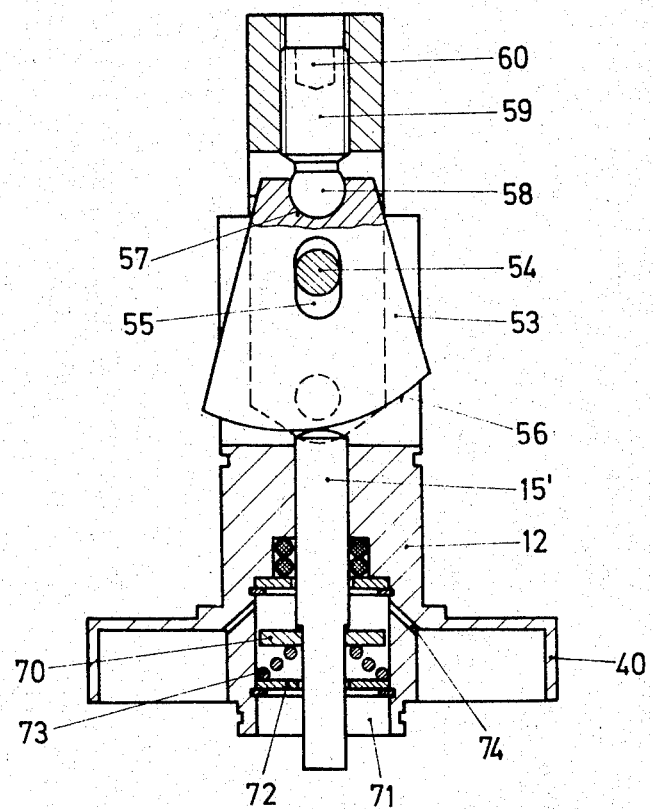
FIG. 9 shows a sectional view of the regulating arrangement according to a second embodiment for setting the temperature and the flow of water with a lever.
Figure 10:
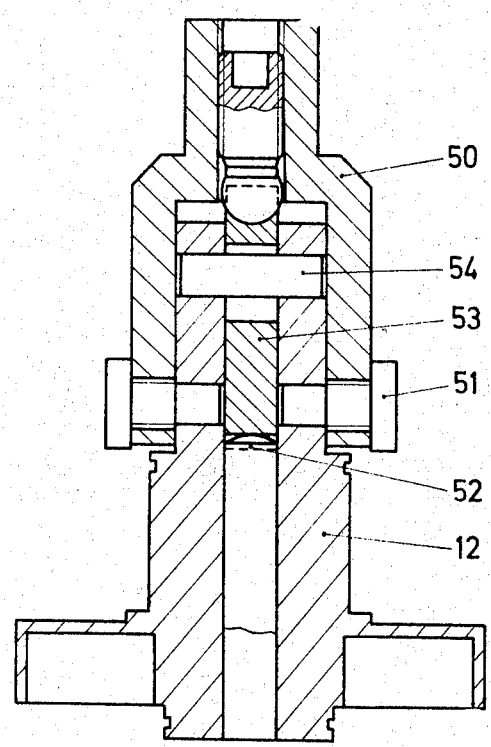
FIG. 10 shows a sectional side view of the arrangement of FIG. 9.
Figure 11:
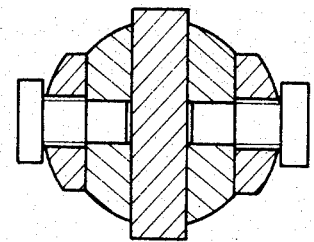
FIG. 11 shows a top view of the arrangement of FIG. 10.

In the following embodiment described with reference to FIG. 9 to 11, the two regulating knobs, namely the flow control handle 5 and the temperature regulating ring 6, are replaced by a single lever. The travel of the lever controls the outlet flow and rotation of the lever controls the outlet temperature. So that the travel of the lever need not be too great, while nevertheless the conditions of a self-restraining eccentric can be maintained, a step-up lever system is employed. Specifically, the arrangement consists of a lever 50 mounted on the temperature regulating part 12, provided with a concentric threaded bore at the top and tiltably attached to the temperature regulating part 12 by screws 51 at the bottom. Thus the lever 50 embraces the temperature regulating part 12. The temperature regulating part 12 is provided with a slot 52 in which an eccentric plate 53 engages. As shown in FIG. 9, the eccentric plate 53 is pivoted in the temperature regulating part 12 on a pin 54. The pin 54 is arranged perpendicular to the axis of the temperature regulating part, so that it intercepts the axis. The eccentric plate 53 is provided with an oblong hole 55 to be guided by the pin 54. The bottom boundary face 56 of the eccentric plate 53 has the shape of a circular segment, the center of the circle being off the centerline of the temperature regulating part 12. The bottom boundary face 56 is met by the end of the spindle 15'. This spindle is freely displaceable along its axis and is pressed against the boundary face 56 of the eccentric plate 53 by the spring action on the pressure plate 10.

In the top of the eccentric plate 53, a recess 57 is provided, in the shape of a spherical socket in this example. This socket is engaged by the ball head of an adjusting screw 59 in the thread of the lever 50. The adjusting screw may for example have a hexagonal socket 60 by means of which it can be adjusted along the axis of the lever from above. This affords a simple adjustment of the closing point of the valves and the corresponding lever position.

The step-up of the lever is determined essentially by the distance between the pin 54 and the screws 51 forming the pivot of the lever.

The pin 54 is the axis of the tilting and displacing motion of the eccentric plate 53. By transmission of the tilting motion to the spindle 15, the outlet flow of the mixing valve is controlled in the manner previously described.

To control the mixture ratio, the lever is rotated about the axis of the temperature regulating part 12, this rotation being transmitted to the temperature regulating part 12 by the screws 51 which pivot the lever on the temperature regulating part 12. This motion, in the manner previously described, rotates the axis of tilt AB of the pressure plate and thus changes the mixture ratio.

According to a further elaboration of the arrangement described, means of hydraulically damping the spindle motion are provided in the bottom of the temperature regulating part 12 as shown in FIG. 9. These means consist of a disc 70 centrally mounted on the spindle 15 and only slightly smaller in outside diameter than a cylindrical recess 71 provided at this point in the temperature regulating part. This forms a narrow annular gap. The bottom of the cylindrical recess is closed off by a washer 72 in firm contact with the wall of the recess. Between the two discs 70 and 72, a compression spring 73 is arranged. The disc 70 divides the volume of the cylindrical recess into two approximately equal halves. Between the interior space formed by the cylindrical recess 71 and the inside wall of the cup 40, a vent 74 is provided.

When the mixing valve is first placed in service, the cylindrical recess 71 fills with liquid, for example water, since the recess closed off by the cover disc 72 is not sealed off from the outside and the hole provided for the spindle 15 will allow water to pass through, while the air initially contained in the cylindrical recess escapes through the vents 74. Now if the spindle is moved axially, the water present above and below the disc will flow through the annular gap into the enlarging cylinder volume, while the throttling action of the gap will prevent rapid motion of the spindle.

I claim:

1. Mixing valve for setting the mixture ratio of two fluids and the total flow rate thereof through two spaced inlet valves (4), comprising a pressure plate (10) engaging both valves on a diameter thereof and capable of being tilted on a tilt axis spaced from its diameter, an axially movable flow control part (15) bearing against a central portion of said pressure plate for adjusting its angle of tilt on said tilt axis, and a rotatable temperature regulating part (12) engaging said pressure plate for rotating it, whereby total volume of flow through the spaced inlet valves is controlled by motion of the flow control part to increase or decrease the angle of tilt of the pressure plate and the mixture ratio of flow through the spaced inlet valves is controlled by motion of the temperature regulating part to vary the position of the tilt axis of the pressure plate relative to the line joining the spaced inlet valves.

2. Mixing valve according to claim 1, characterized in that the tilt axis of the pressure plate is substantially tangent to a circle described on the pressure plate by the centers of the spaced inlet valves where the plate is rotated.

3. Mixing valve according to claim 1, characterized in that the pressure plate (10) is guided in two bearings (A, B) connected with the temperature regulating part (12) and determining the axis of tilt, the pressure plate engagement with the flow control part (15) being in the form of a slip coupling permitting axial rotation of the pressure plate relative to the flow control part in any position of the flow control.

4. Mixing valve according to claim 3, characterized in that the bearings (A, B) of the pressure plate (10) are formed by two arms (30) of a guide spring (11) secured concentrically in relation to the pressure plate, said arms enclosing an angle of less than 180°.

5. Mixing valve according to claim 4, characterized in that the pressure plate (10) is provided on the side towards the guide spring (11) with a concentric annular groove (31) arranged in its marginal zone, and in that the annular groove is engaged by a compression spring (32) having a purchase on the guide spring (11) and arranged in the region of the smaller angle enclosed by the arms (30).

6. Mixing valve according to claim 5, characterized in that the compression spring (32) is in the form of a leaf spring tab.

7. Mixing valve according to claim 4, characterized in that the bearings (A, B) are each formed by a fork-shaped arrangement of the arms (30) embracing the pressure plate.

8. Mixing valve according to claim 4, characterized in that the guide spring is firmly attached to and rotatable with the temperature regulating part (12).

9. Mixing valve according to claim 4, characterized in that the stems (8) of the inlet valves are guided by a common valve member spring (18) attached to the housing (1) and in that the said spring (18) enables the valve members to act as back-up safeties in case of failing water pressure.

10. Mixing valve according to claim 4, characterized in that the pressure plate (10) is tightly attached to an elastic corrugated tube (21) fixed to the mixing valve housing (1) with interposition of a gasket (23) and exerting an axially directed spring action on the pressure plate, and in that the guide spring (11) is arranged completely inside the chamber formed by the corrugated tube and the pressure plate, entirely closed off from the fluid.

11. Mixing valve according to claim 10, characterized in that the guide spring (11) is U-shaped, one leg of the U being fixed to the temperature regulating part (12) and the other leg being made into arms (30) spread at the tips and clipping into an annular groove (31) of the pressure plate (10), thereby forming the bearings (A, B).

12. Mixing valve according to claim 11, characterized in that the spread between legs of the guide spring is adjustable by means of a setscrew (25).

13. Mixing valve according to claim 30 characterized in that a thermostat element means (20) is mounted on the temperature regulating part (12) of the mixing valve, said thermostat element means being connected by way of a linkage (40-43) to the temperature regulating part (12) and the guide spring (11), which thermostat element means upon variation of the temperature of mixed hot and cold fluids passing through the valves (4) generates a rotation which the linkage (40-43) transforms into a rotation of the guide spring (11) and pressure plate (10) relative to the temperature regulating part (12).

14. Mixing valve according to claim 13, characterized in that, on the temperature regulating part (12), a cup (40) is provided, in that radially arranged bimetal elements (20) are provided in one sector of the cup, in that the sector containing the bimetal elements is bounded at one end by a projection (41) attached to the cup (40), and at the other end by another projection (42) connected to the part (11) determining the mixture ratio, which faces the mouth of the cup.

15. Mixing valve according to claim 14, characterized in that a compression spring (43) is arranged between the first projection (41) and the second (42).

16. Thermostat according to claim 13, characterized in that, as thermostatic element, at least one spirally wound bimetal spring is provided.

17. Mixing valve according to claim 1, characterized in that shut-off and regulating screws (19) operable from the outside and acting on the valve seats (7) of the inlet valves (4) are provided in the housing (1).

18. Mixing valve according to claim 1, characterized in that on the temperature regulating part (12), a lever (50) is pivoted on an axis perpendicular to the axis of rotation of the temperature regulating part, in that an eccentric plate (53) capable of being actuated by the lever and affording a mechanical advantage is arranged in the temperature regulating part (12), and in that the power of the eccentric plate (53), stepping up the lever, acts on a plunger (15') capable of being displaced along the longitudinal axis of the temperature regulating part.

19. Mixing valve according to claim 18, characterized in that the eccentric plate (53) is provided with an oblong hole (55) through which a pin (54) is passed and fixed in the temperature regulating part (12), in that the purchase (57, 58) of the lever (50) is provided in the part of the eccentric plate (53) above the oblong hole, and in that the eccentric plate (53) is bounded by a segment of a circle at the bottom edge, more distant from the oblong hole (55) than the purchase of the lever (50), the center of said circle being off the centerline of the temperature regulating part (12).

20. Mixing valve according to claim 19, characterized in that the purchase of the lever (50) is in the form of a ball (58) engaging a spherical socket (57) in the eccentric plate.

21. Mixing valve according to claim 20, characterized in that the ball (58) is associated with an adjusting screw (59) capable of being adjusted along the axis of the lever (50) from the outside.

22. Mixing valve according to claim 18, characterized in that the plunger (15') is provided with hydraulic damping means (70-74) cushioning its longitudinal motion.

23. Mixing valve according to claim 22, characterized in that the hydraulic damping means consist of a cylindrical recess (71) provided in the temperature regulating part (12) and a concentric disc connected with the plunger (15'), the outside diameter of the disc (70) being smaller than the diameter of the cylindrical recess (71).

24. Mixing valve according to claim 23, characterized in that the cylindrical recess (71) is closed off by a check valve (72, 73) opening in the direction of the cylindrical recess (71).

25. Mixing valve according to claim 24, characterized in that the interior chamber formed by the cylindrical recess (71) is in communication with the outside by way of vents (74).

26. Mixing valve according to claim 1, characterized in that the flow control part (15) comprises an axially movable spindle which bears against the center of the pressure plate (10).

* * * * *